Figure 1:
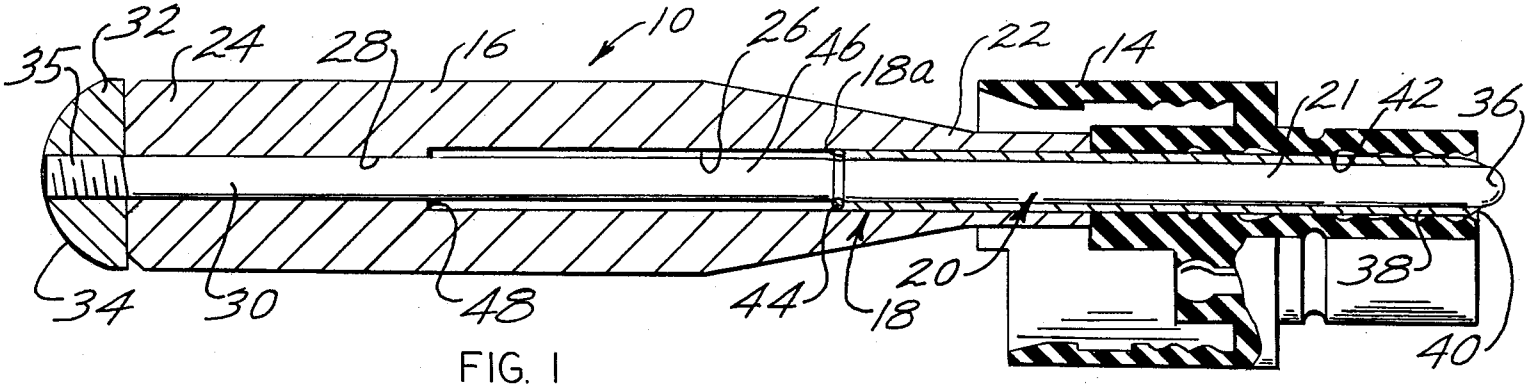
Figure 2:
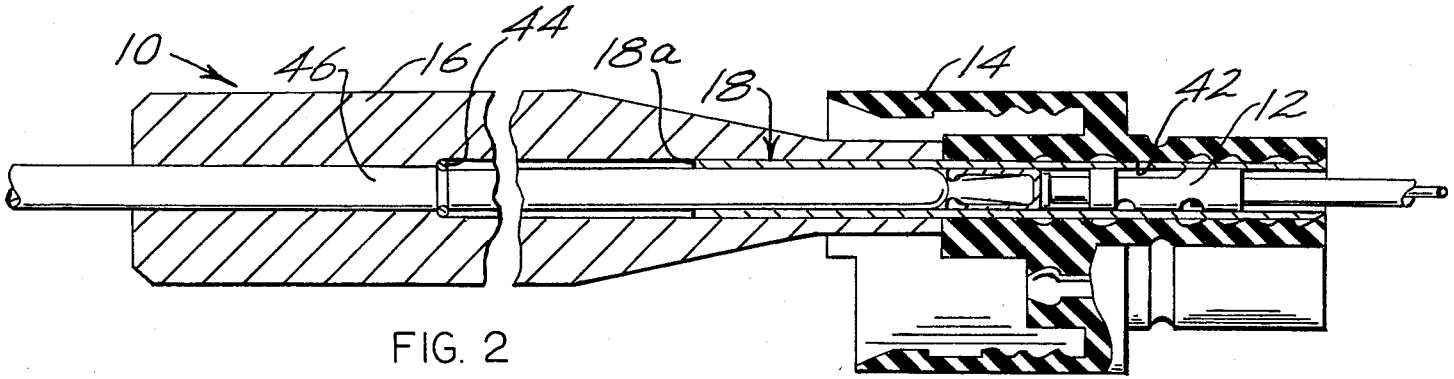
Figure 3:
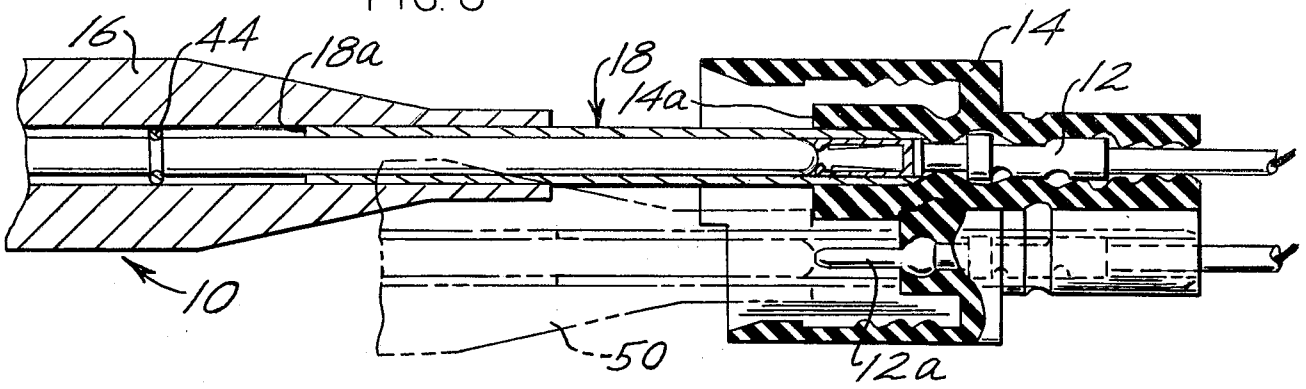
Figure 4:
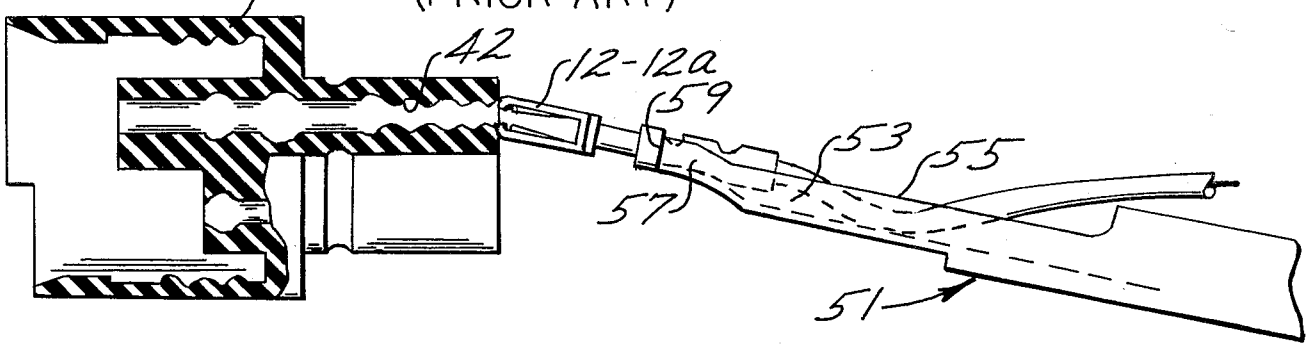
FIG. 4 (PRIOR ART)

United States Defensive Publication [19] (H) [11] T101,002

Ellington, III [43] Sep. 1, 1981

[54] TOOL FOR MANUALLY INSERTING ELECTRICAL CONTACTS

[76] Inventor: Rayburn P. Ellington, III, 4714 N. Laurel Dr., Peoria, Ill. 61614

[21] Appl. No.: 127,151

[22] Filed: Mar. 4, 1980

[51] Int. Cl.[3] ..... H01R 43/00

[52] U.S. Cl. ..... 29/747; 29/764

[57] ABSTRACT

A hand tool for inserting and removing electrical contacts from shaped axial bores formed in coupling-type elastic connector housings has coacting members that allow removal, ready reception and accurate placement of the contacts within the axial housing bores.

1 Claim, 2 Sheets Drawing,

6 Pages Specification

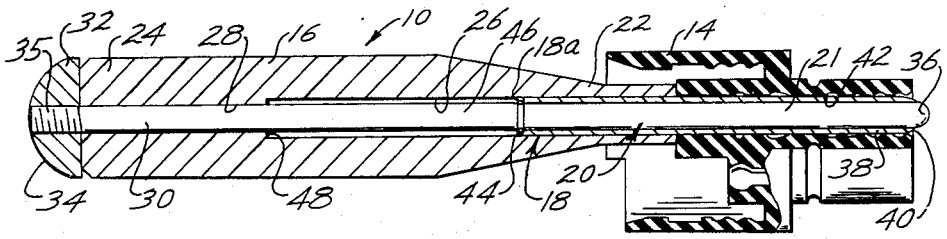

The file of this unexamined application may be inspected and copies thereof may be purchased (849 O.G. 1221, Apr. 9, 1968).